(No Model.)
G. SINGER.
ELASTIC TIRE FOR WHEELS.
No. 429,818. Patented June 10, 1890.
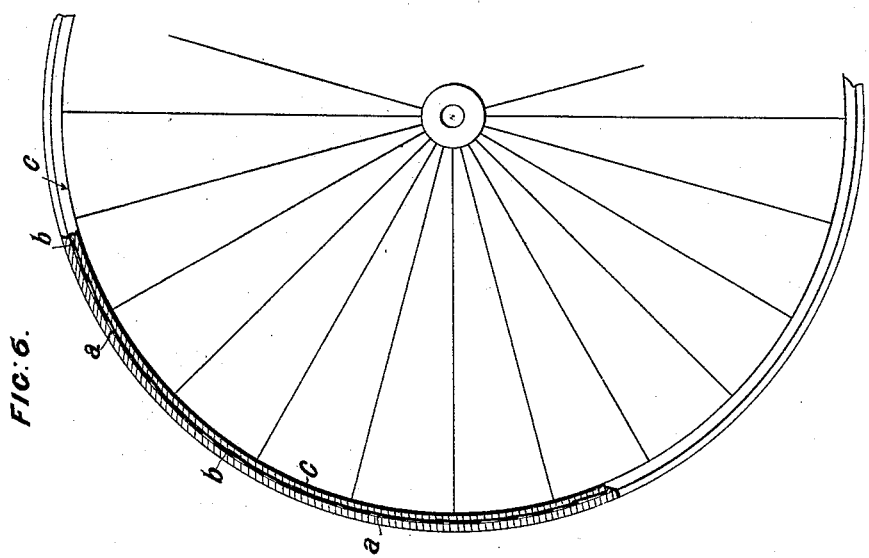
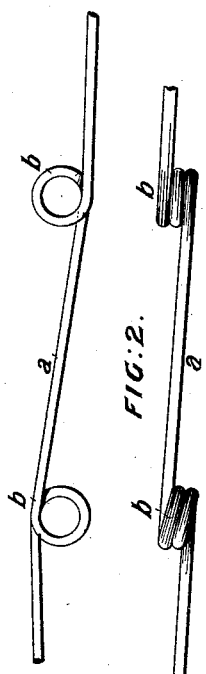
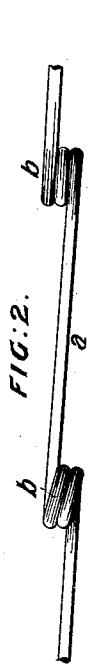
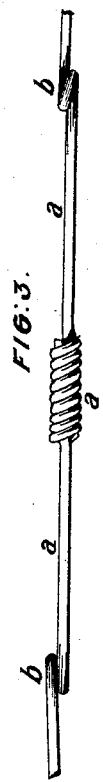
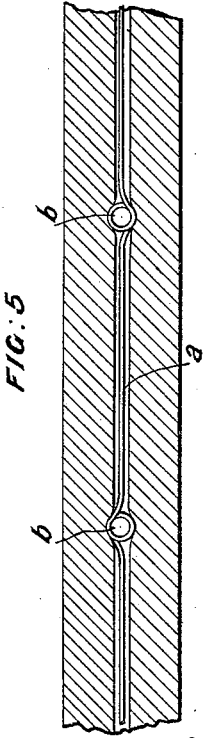
Witnesses
Cha H Smith
J. Staib
Inventor
George Singer.
for Lemuel W. Serrell
Atty

UNITED STATES PATENT OFFICE.

GEORGE SINGER, OF COVENTRY, COUNTY OF WARWICK, ENGLAND.

ELASTIC TIRE FOR WHEELS.

SPECIFICATION forming part of Letters Patent No. 429,818, dated June 10, 1890.

Application filed March 24, 1890. Serial No. 345,067. (No model.) Patented in England November 26, 1889, No. 18,982.

*To all whom it may concern:*

Be it known that I, GEORGE SINGER, a subject of the Queen of Great Britain, residing at Coventry, in the county of Warwick, England, have invented certain new and useful Improvements in Elastic Tires for Wheels, (for which a patent has been granted to me in Great Britain, bearing date November 26, 1889, No. 18,982,) of which the following is a specification.

My invention refers to improved means whereby better provision than heretofore is made for securing rubber tires to wheels of velocipedes and other road-vehicles, and for this purpose I introduce into the tire, either after or during the manufacture, a coiled or twisted spring-wire, as hereinafter described.

In order that my invention may be fully understood and readily carried into effect, I will describe same by reference to the accompanying drawings.

Figure 1 shows in plan a piece of wire coiled or bent for the purposes of my invention. Fig. 2 is an elevation showing the coils double. Fig. 3 is an elevation showing a single coil with the two ends of the wire twisted together to join same. Fig. 4 shows a wire with coils, the centers of the latter being in a straight line with the wire. Fig. 5 shows a similar piece of wire to that illustrated at Fig. 4 inserted in the central aperture of a piece of rubber tire; and Fig. 6 is a side elevation, partly in section, drawn to a smaller scale than the previous figures, of a velocipede-wheel showing in diagram how the wire would appear when inserted in the tire in the rim of the wheel.

These spring-wires are formed of a plain piece of steel wire $a$, which at intervals is coiled or bent over itself, as shown at $b$, and preferably laid in the same plane and on opposite sides alternately of the length of the wire, as best seen at Figs. 1 and 3, and by this means some degree of elasticity is obtained lengthwise, so that after being made into a ring somewhat smaller than the hollow-shaped rim of the wheel it may be sprung over the edge of the rim and then return to its normal size. The rubber tire through which it has been previously passed is thus retained in its place in the hollow-shaped rim $c$ of the wheel. The wire is made of steel or other metal capable of forming a spring, and I obtain the required elasticity in its length by forming upon it a series of small coil-springs, as before described. These coils $b$ are made either along the whole length or on only part of it. They are made at intervals of from half an inch upward, and there may be one or more coils upon the wire, as shown at Fig. 2, at each point, according to the degree of elasticity required, and the coils may be made central with the wire, as at Fig. 4, or otherwise.

The tire is composed of a rubber cord having a small hole through its length, either in its center or about three-sixteenths inch from the outside. This hole is made either round, oval, or of any other shape, the size of the hole being made sufficiently large to allow the coils $b$ upon the wire being pulled through by a moderate degree of force. The length of the rubber cord is rather greater than the circumference of the wheel. The spring-wire is drawn through the hole in the tire, the coils $b$ being preferably arranged to lie with their flat sides upward and downward, as shown best in Fig. 5, so that they may present a larger surface on the side the tire is pressed upon the rim of the wheel. The ends of the wire are joined by looping two or more of the coils together, or by twisting the ends of the wire together, or by any convenient method by which the ends of wire are usually joined. The tire, wired as before described, is then sprung upon the rim of the wheel either by hand or by using mechanical means to stretch the wire through the contraction of the coils.

The coiled wire may be placed in the tire during the process of manufacture, and in case of tires for carriage-wheels I prefer to adopt this course.

For vehicles the coils are made larger, and as the flat sides of these press upon the tire the tendency to cut the rubber and of the rubber moving on the wire is removed, the coils of the wire being embedded in the rubber.

I am aware that a wire core in an elastic tire is not new; that an elastic tire having a wavy or serpentine spring-wire molded into the tire is not new; that an elastic wheel-tire composed of a tubular rubber, a corrugated or wavy spring-wire drawn through the rubber tube and the ends of said wire joined, the rubber being under compression lengthwise upon the wire, is not new.

What I claim is—

An elastic rubber tire having a wire coiled or bent over itself at intervals and laid in the aperture in the tire, substantially as set forth.

GEORGE SINGER.

Witnesses:
C. H. HORSWILL,
ARTHUR POOLE,
*Clerks.*